(12) United States Patent
Okada

(10) Patent No.: US 8,748,019 B2
(45) Date of Patent: *Jun. 10, 2014

(54) CAR POWER SOURCE APPARATUS

(71) Applicant: Sanyo Electric Co., Ltd., Osaka (JP)

(72) Inventor: Wataru Okada, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/800,481

(22) Filed: Mar. 13, 2013

(65) Prior Publication Data

US 2013/0189552 A1 Jul. 25, 2013

Related U.S. Application Data

(63) Continuation of application No. 12/638,390, filed on Dec. 15, 2009, now Pat. No. 8,426,079.

(30) Foreign Application Priority Data

Dec. 27, 2008 (JP) ................................. 2008-335518

(51) Int. Cl.
*H01M 2/34* (2006.01)
(52) U.S. Cl.
USPC ............................................ 429/53; 429/61
(58) Field of Classification Search
USPC .................................................... 429/53, 61
See application file for complete search history.

(56) References Cited

U.S. PATENT DOCUMENTS 7,771,862 B2    8/2010   Cho
(Continued)

FOREIGN PATENT DOCUMENTS

CN          1770544        5/2006
(Continued)

OTHER PUBLICATIONS

Chinese Office Action dated Jul. 3, 2012 in corresponding Chinese Patent Application No. 200911000236.0 with partial English translation.
Office Action issued Dec. 3, 2013 in corresponding Japanese Application No. 2008-335518.

*Primary Examiner* — Mark F Huff
*Assistant Examiner* — Monique Wills
(74) *Attorney, Agent, or Firm* — Wenderoth, Lind & Ponack, L.L.P.

(57) ABSTRACT

A case (20) of each battery cell (1) houses a current interrupt device (30) that cuts-off current when internal pressure exceeds a set pressure. The case has a rectangular outline with a pair of opposing planar surfaces (20A). An electrode unit (10), which is a stack of positive and negative electrode plates (10A) with intervening separators (10C), and the current interrupt device are disposed between the pair of opposing planar surfaces. A plurality of battery cells is stacked with opposing planar surfaces opposite each other to form a battery block (2). The power source apparatus has a pair of endplates (4) disposed at the ends of the battery block, the pair of endplates is connected by connecting components (5), and the pair of endplates holds the battery cells in the stacked configuration applying pressure in a direction perpendicular to the opposing planar surfaces.

6 Claims, 10 Drawing Sheets

(56) References Cited

U.S. PATENT DOCUMENTS

| | | | |
|---|---|---|---|
| 8,426,079 B2* | 4/2013 | Okada | 429/158 |
| 2006/0093903 A1 | 5/2006 | Hong et al. | |
| 2008/0038628 A1 | 2/2008 | Yamauchi et al. | |
| 2008/0138698 A1 | 6/2008 | Ogami et al. | |
| 2008/0280194 A1* | 11/2008 | Okada | 429/99 |
| 2010/0091051 A1* | 4/2010 | Rueby | 347/8 |
| 2010/0099023 A1 | 4/2010 | Kuroda et al. | |

FOREIGN PATENT DOCUMENTS

| | | |
|---|---|---|
| CN | 101202333 | 6/2008 |
| JP | 11-329405 | 11/1999 |
| JP | 2006-128104 | 5/2006 |
| JP | 2008-66255 | 3/2008 |
| JP | 2008-108457 | 5/2008 |
| JP | 2008-282582 | 11/2008 |

* cited by examiner

CAR POWER SOURCE APPARATUS

BACKGROUND OF THE INVENTION

1. Field of the Invention

The present invention relates to a car power source apparatus that supplies power to a motor that drives the vehicle.

2. Description of the Related Art

To increase power supplied to the motor that drives a vehicle, the car power source apparatus increases output voltage of a battery block by connecting many rechargeable batteries in series to form that battery block. This car power source apparatus is discharged to supply power to the motor when the vehicle is driven, and is charged by a generator during regenerative braking of the vehicle. Battery discharge current determines the driving torque of the motor, and battery charging current determines the braking performance of the regenerative braking system. Therefore, to increase the driving torque of the motor that accelerates the vehicle, it is necessary to increase battery discharge current. To improve regenerative braking, charging at high currents is required. As a result, batteries of the car power source apparatus are charged and discharged with high currents. To improve the safety of batteries charged and discharged with high currents, a battery housing a current interrupt device has been developed to cut-off current when internal battery pressure becomes abnormally high. (Refer to Japanese Laid-Open Patent Publication No. 2006-128104.)

The battery described above can improve safety by cutting-off current when internal pressure becomes abnormally high. However, this battery has the drawback that the current interrupt device can be damaged by vibration to cut-off current and make the battery unusable. This is because vehicle vibration can cause the electrodes to move inside the battery case putting a load on the connection region of the current interrupt device. The connection region of the current interrupt device is designed with a connection strength that results in separation and current cut-off when internal battery pressure rises abnormally. If the connection region is too strong, it will be unable to separate and cut-off current when internal pressure rises abnormally. Consequently, there are constraints on the strength of the connection region, and it has the drawback that it separates easily with vibration. In particular, for batteries installed on-board a vehicle, vehicle vibration during driving cannot be eliminated, and the current interrupt device can cut-off current due to the vehicle vibration. If the current interrupt device of a battery in a car power source apparatus cuts-off current during driving, the motor will stop suddenly and it will be impossible to maintain smooth driving. Even worse, this battery has the drawback that in a pure electric automobile, the vehicle becomes completely unable to drive.

The present invention was developed with the object of correcting the drawbacks described above. Thus, it is an important object of the present invention to provide a car power source apparatus that improves battery safety with a current interrupt device housed in each battery to cut-off current when internal battery pressure rises abnormally, while effectively preventing current interrupt device cut-off due to vehicle vibration.

SUMMARY OF THE INVENTION

The car power source apparatus of the present invention is provided with a current interrupt device housed in a case of each battery cell that deforms to separate a connection point and cut-off current when battery cell internal pressure becomes greater than a set pressure, and a high voltage battery having a plurality of series or parallel-connected battery cells with current interrupt devices connected to the electrode terminals. A battery cell case has a rectangular outline and a pair of opposing planar surfaces. An electrode unit that is a stack of positive and negative electrode plates with intervening separators, and a current interrupt device are disposed between the pair of opposing planar surfaces. Further, a plurality of battery cells is stacked with opposing planar surfaces opposite each other to form a battery block. The car power source apparatus has a pair of endplates disposed at both ends of the battery block, and connecting components that connect the pair of endplates. The battery block is held with pressure applied in a direction perpendicular to the opposing planar surfaces of the stack of battery cells between the pair of endplates.

The car power source apparatus described above realizes the extremely important characteristic for a car power source apparatus that battery cell safety is improved by housing a current interrupt device in each battery cell to cut-off current when internal battery pressure rises abnormally, and current interrupt device cut-off due to vehicle vibration is effectively prevented. This is because the case of each battery cell housing a current interrupt device has a pair of opposing planar surfaces of rectangular shape; and an electrode unit that is a stack of positive and negative electrode plates with intervening separators, and a current interrupt device are disposed between that pair of opposing planar surfaces. Further, a plurality of battery cells are stacked with opposing planar surfaces opposite each other to form a battery block, a pair of endplates is disposed at both ends of the battery block, the two endplates are connected by connecting components, and the stack of battery cells held by the endplates is retained with pressure applied in a direction perpendicular to the opposing planar surfaces. In this power source apparatus, an electrode unit and current interrupt device are disposed between the opposing planar surfaces of each battery cell, a plurality of these battery cells is stacked to form a battery block, and pressure is applied to both ends of the battery block by the endplates to compress the opposing planar surfaces of the battery cell cases. Consequently, the electrode unit and current interrupt device of each battery cell are maintained in a compressed state by the opposing planar surfaces, and the electrode unit and current interrupt device do not move due to vibration. Therefore, disconnection of the connection region and current cut-off are prevented by the electrode unit and current interrupt device moving together.

In the car power source apparatus of the present invention, a current interrupt device can be provided with a deformable metal plate that deforms with battery cell internal pressure, and connection metal that locally connects to the deformable metal plate for electrical connection. When battery cell internal pressure becomes greater than a set pressure, the deformable metal plate deforms and separates from the connection metal to cut-off current. This car power source apparatus can reliably cut-off current when internal battery cell pressure rises above the set pressure while the current interrupt device has a simple structure.

In the car power source apparatus of the present invention, the deformable metal plate can be a diaphragm curved in an arch-shape, and the peak of the arch-shaped diaphragm can be welded for electrical connection to the connection metal. This car power source apparatus has the characteristic that since the arch-shaped diaphragm deforms with internal battery cell pressure to cut-off current, current can be reliably cut-off with abnormal internal pressure rise and the cut-off state can be maintained.

In the car power source apparatus of the present invention, the diaphragm can be connected to an electrode terminal, and the connection metal can be connected to an electrode tab that is connected to an electrode plate. This power source apparatus has the characteristic that by housing battery cell contents in a case that retains the contents in an immovable fashion sandwiched between opposing planar surfaces, separation of the diaphragm connection region can be reliably prevented. This is because retaining the diaphragm with an electrode terminal and retaining the electrode unit by sandwiching it between opposing planar surfaces of the case allows prevention of relative movement between the diaphragm and the connection metal, which is connected to the electrode tab.

In the car power source apparatus of the present invention, the positive and negative electrode plates and intervening separators can stacked and wound into a spiral-shaped electrode unit having planar sections and U-shaped rounded sections. This electrode unit can be held in a battery cell case with planar sections oriented parallel to the opposing planar surfaces of the case. In this car power source apparatus, the planar sections of the electrode unit can be compressed in the electrode stacking direction and retained in a stationary state by the opposing planar surfaces of the case, while the electrode unit can be efficiently fabricated by winding it in a spiral-shape. Consequently, separation of the current interrupt device connection region due to vehicle vibration can be reliably prevented.

In the car power source apparatus of the present invention, the case can be a metal case, and insulating material can be provided between the inside surfaces of the case and the conducting regions of the current interrupt device.

The car power source apparatus of the present invention can be provided with insulating material between the inside surfaces of the case and conducting regions of the electrode unit.

In the car power source apparatus of the present invention, an insulating layer can be provided on the inside surfaces of the case. This power source apparatus can prevent electrical contact between the case and the current interrupt device or the electrode unit while applying pressure to opposing planar surfaces of the case to retain the electrode unit and current interrupt device in a stationary fashion. Therefore, the case can be retained with pressure applied to the opposing planar surfaces, and detrimental effects such as battery cell internal short circuits can be prevented.

In the car power source apparatus of the present invention, a current interrupt device is housed in the upper section of each battery cell, upper and lower sections of the endplates are joined by the connecting components, and upper sections of the pair of endplates are pulled together by the connecting components to retain the battery cells with pressure applied to their upper sections. In this car power source apparatus, upper sections of the battery cell cases housing current interrupt devices can be retained with pressure applied by the endplates via the upper connecting components. In addition, lower sections of the battery cell cases housing electrode units can be retained with pressure applied by the endplates via the lower connecting components. This allows both the current interrupt device and the electrode unit to be held in a stationary manner inside the case of each battery cell. Therefore, this power source apparatus has the characteristic that separation of a current interrupt device connection region due to vehicle vibration can be more reliably prevented.

In the car power source apparatus of the present invention, the current interrupt device can be connected between an electrode terminal and an electrode tab connected to the electrode unit. This car power source apparatus can prevent any movement due to electrode tab vibration by reliably retaining the electrode unit and current interrupt device with pressure applied to opposing planar surfaces of the case. Therefore, separation of the connection region of the current interrupt device, which is connected to an electrode tab, can be effectively prevented. The above and further objects of the present invention as well as the features thereof will become more apparent from the following detailed description to be made in conjunction with the accompanying drawings.

DETAILED DESCRIPTION OF THE EMBODIMENT(S)

The car power source apparatus of the present invention is primarily suitable as a power source apparatus for use on-board an electrically driven vehicle such as a hybrid car or electric automobile to supply power to a driving motor to drive the vehicle.

Figure 1:
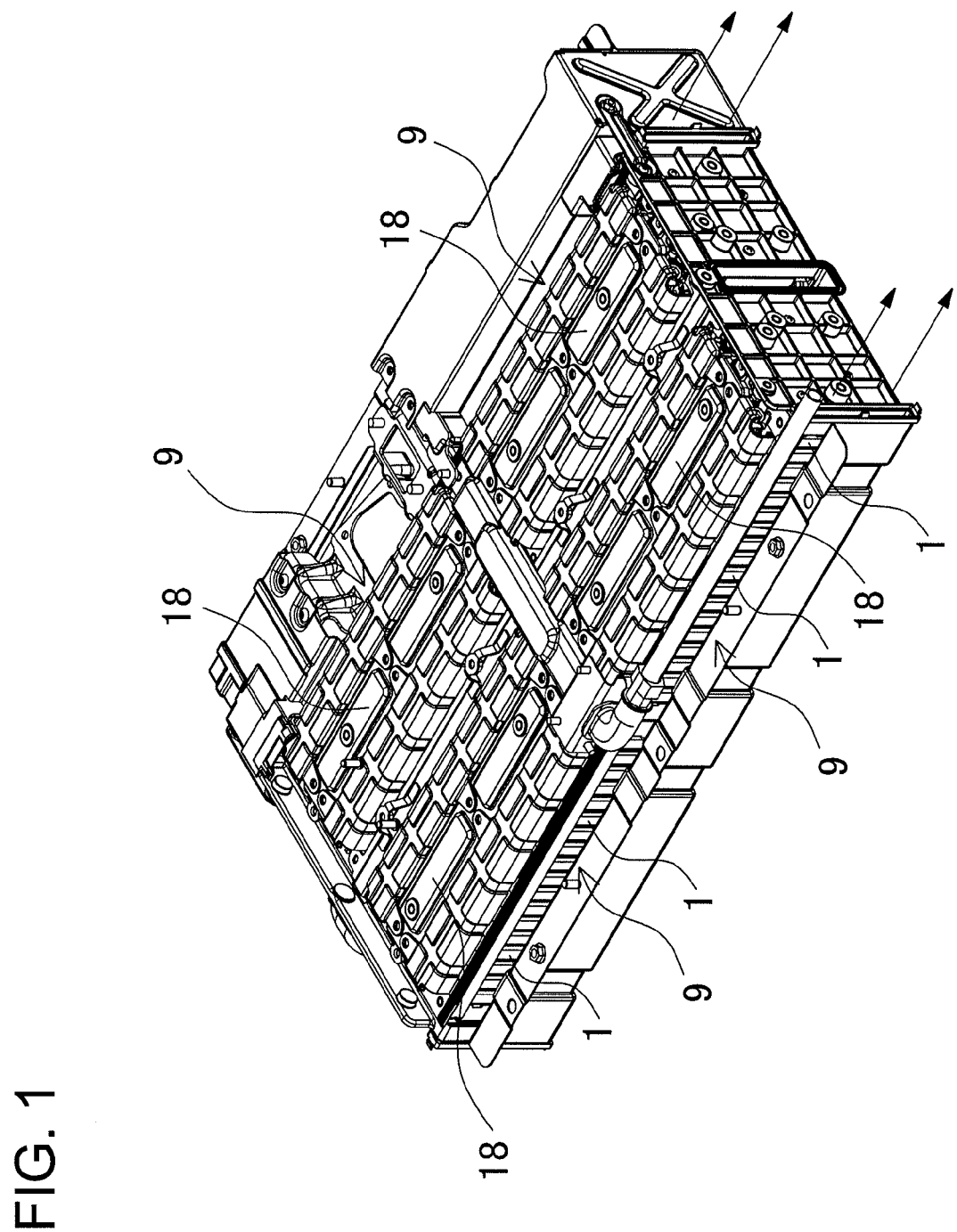
FIG. 1 is a perspective view of a car power source apparatus for an embodiment of the present invention.
Figure 2:
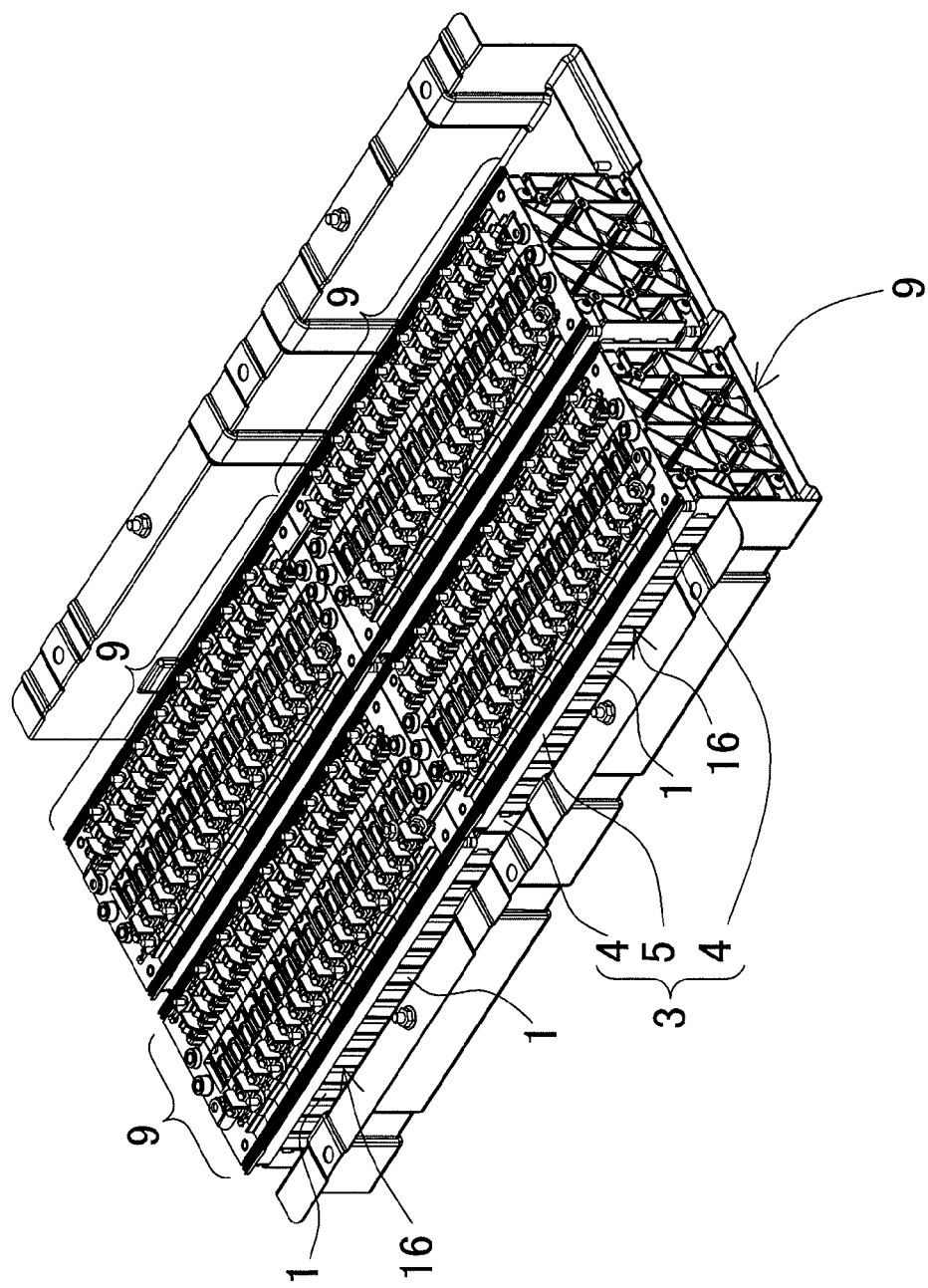
FIG. 2 is a perspective view showing the layout of high voltage batteries in the car power source apparatus shown in FIG. 1.

The car power source apparatus of FIGS. 1-5 is provided with a high voltage battery 9 that has a plurality of rechargeable battery cells 1 connected in series to increase output voltage. The power source apparatus of FIGS. 1 and 2 is provided with four high voltage batteries 9. A high voltage battery 9 preferably has all battery cells 1 connected in series to increase output voltage. However, a high voltage battery can also have a plurality of battery cells connected in parallel and those parallel connected battery cells can in turn be connected in series.

Figure 7:
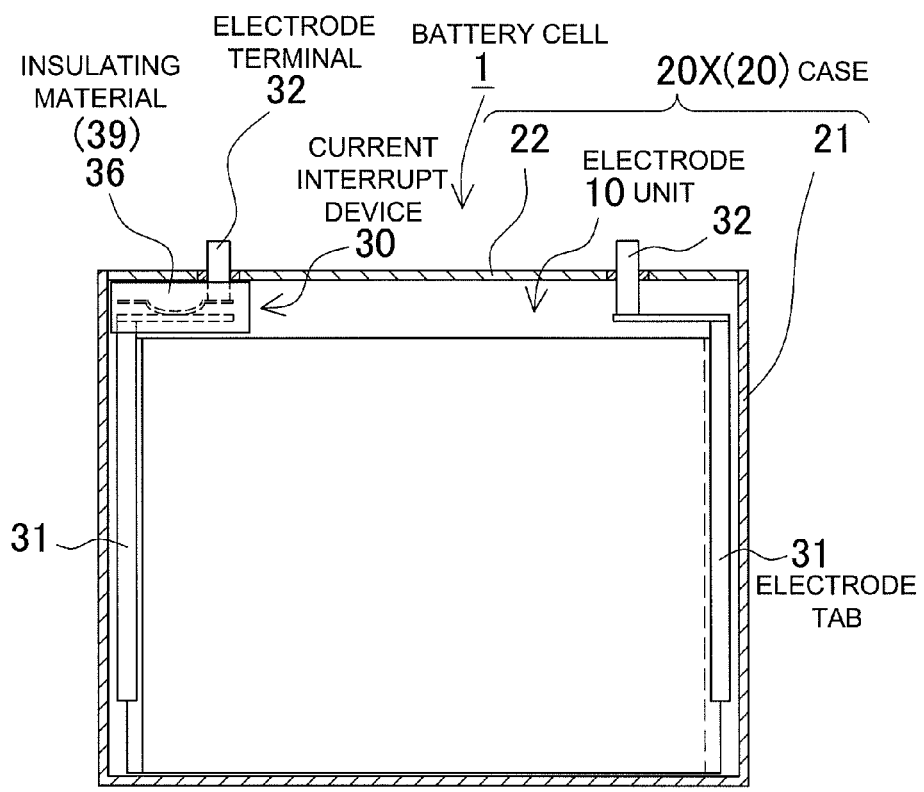
FIG. 7 is a vertical cross-sectional view of the battery cell shown in FIG. 6.
Figure 8:
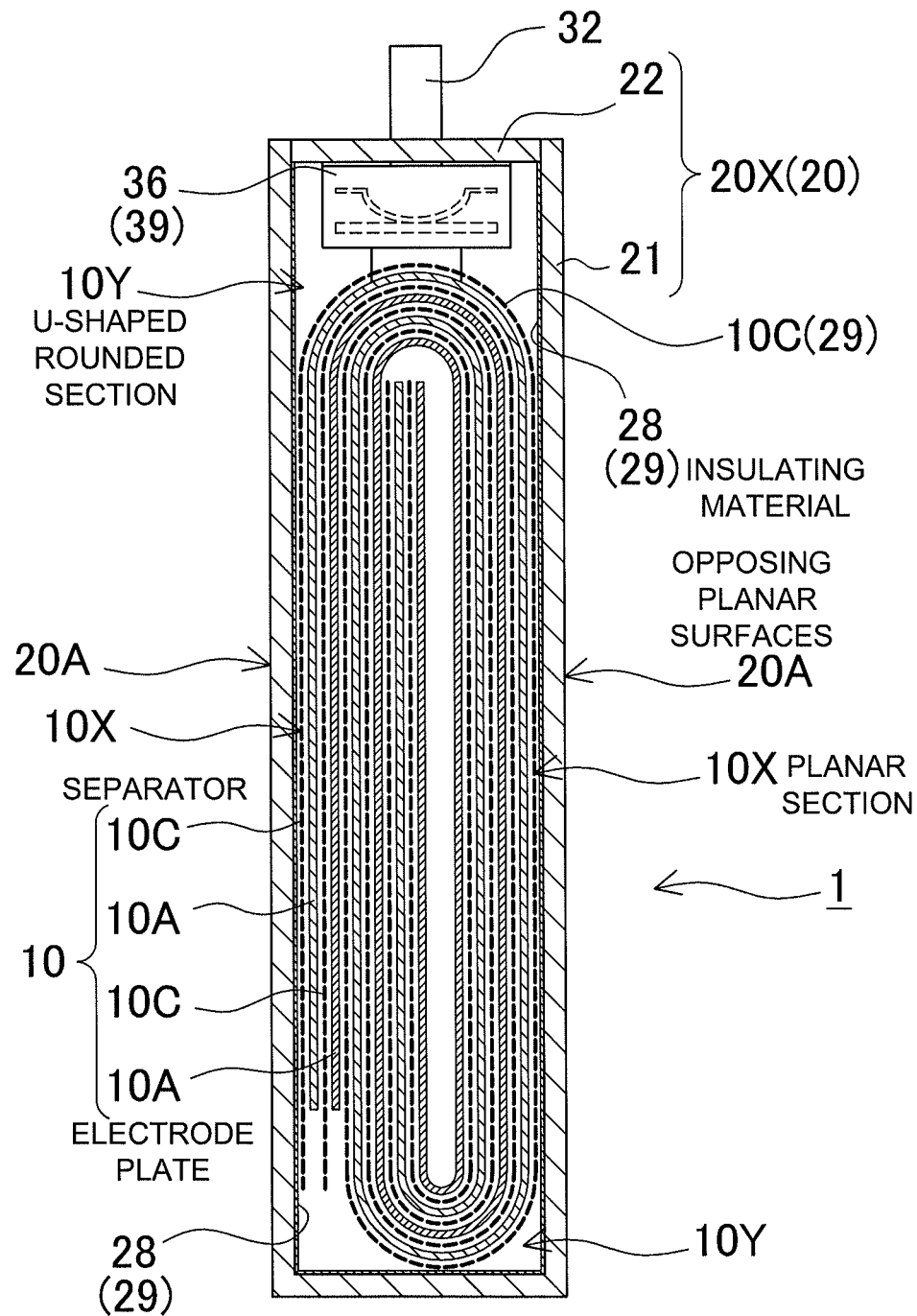
FIG. 8 is a lateral cross-sectional view of the battery cell shown in FIG. 6.
Figure 9:
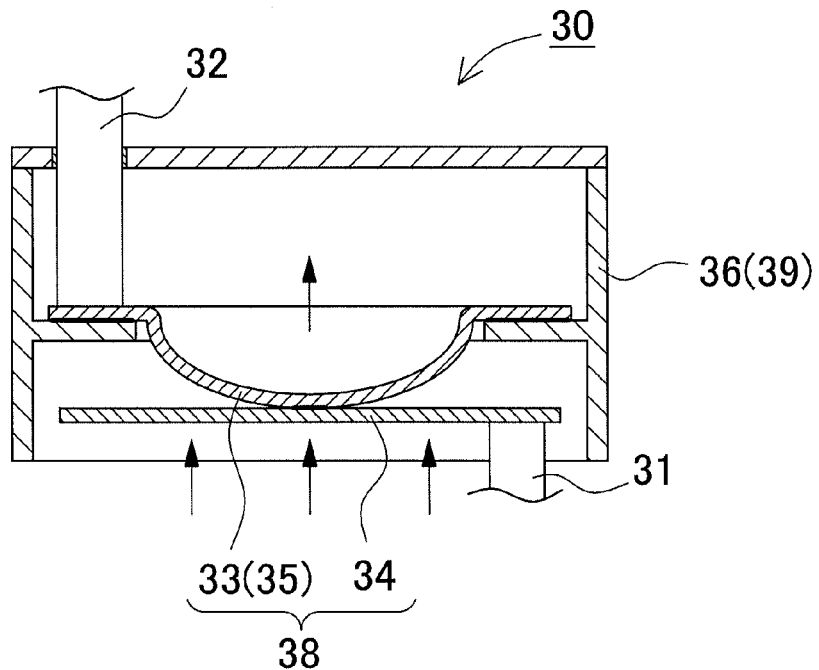
FIG. 9 is an abbreviated cross-sectional view showing one example of a current interrupt device.
Figure 10:
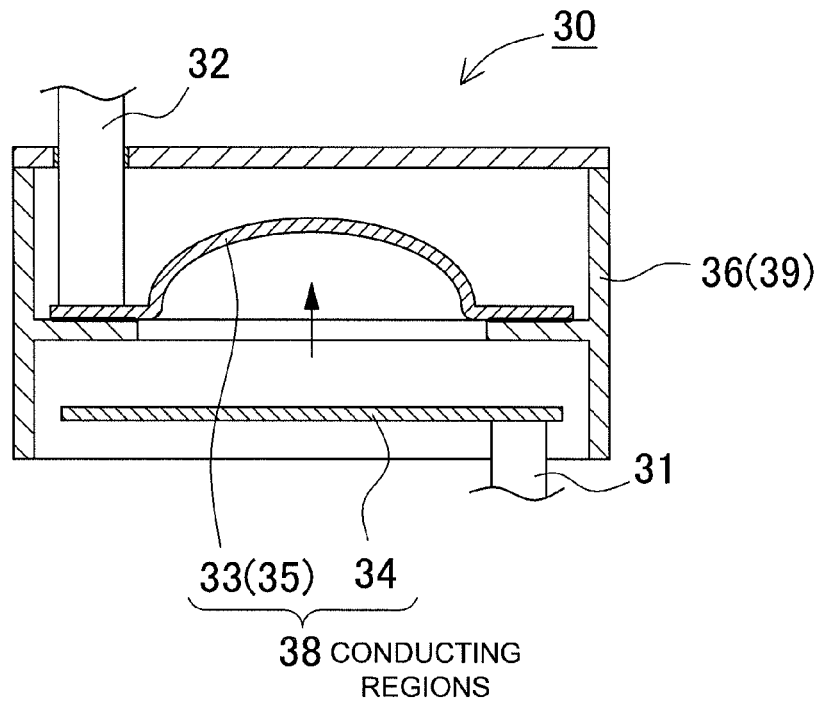
FIG. 10 is an abbreviated cross-sectional view showing the current interrupt device of FIG. 9 in the current cut-off state.

The rechargeable battery cells 1 are lithium ion batteries. However, any batteries that can be recharged, such as nickel hydride batteries or nickel cadmium batteries can be used as battery cells. As shown in FIGS. 7 and 8, a battery cell 1 has an electrode unit 10, which is a stack of positive and negative electrode plates 10A with intervening separators 10C, contained in a case 20 and filled with electrolyte solution. In addition, a battery cell 1 houses a current interrupt device 30 in the case 20. If battery cell internal pressure exceeds a set pressure, the current interrupt device 30 deforms to separate a connection point and cut-off current. FIGS. 9 and 10 are abbreviated cross-section views showing a specific example of a current interrupt device 30. In the battery cell 1 of these figures, the current interrupt device 30 is connected between an electrode tab 31 connected to the electrode unit 10 and an electrode terminal 32 mounted on the sealing plate 22. A current interrupt device 30 in the ON state connects the electrode tab 31 to the electrode terminal 32. If the current interrupt device switches to the OFF state, the electrode tab 31 becomes disconnected from the electrode terminal 32 and battery cell current is cut-off.

FIG. 9 shows the current interrupt device 30 in the non-cut-off state, and FIG. 10 shows it in the cut-off state. The current interrupt device 30 shown in these and other figures is provided with a deformable metal plate 33 that deforms with battery cell 1 internal pressure, and connection metal 34 locally welded to the deformable metal plate 33 for electrical connection. When battery cell internal pressure becomes greater than the set pressure, the current interrupt device 30 deformable metal plate 33 deforms due to pressure and separates from the connection metal 34 to cut-off current as shown in the sequence from FIG. 9 to FIG. 10.

The current interrupt device 30 deformable metal plate 33 is a diaphragm 35 formed to curve in an arch-shape. This diaphragm 35 is connected at its periphery to the lower end of an electrode terminal 32 that is mounted on the sealing plate 22. The peak of the arch-shaped diaphragm 35 is welded to the connection metal 34 for electrical connection. The connection metal 34 is connected to an electrode tab 31. This current interrupt device 30 is in the ON state with the diaphragm 35 connected to the connection metal 34. Further, the diaphragm 35 and connection metal 34 of the current interrupt device 30 are contained inside an inner case 36 made of insulating material such as plastic.

In FIGS. 9 and 10, the inner case 36 allows the bottom surface of the diaphragm 35 to associate with the inside of the battery cell 1, while the top surface of the diaphragm 35 is sealed in an air-tight fashion. Battery cell internal pressure does not act on the air-tight sealed top surface of the diaphragm 35. In this configuration of the current interrupt device 30, battery cell internal pressure acts on the bottom surface of the diaphragm 35 to push the diaphragm 35 upwards. The upward force on the diaphragm 35 increases in proportion to the battery cell internal pressure. Consequently, when internal battery cell pressure rises, the diaphragm 35 is pushed upwards and deforms from the state shown in FIG. 9 to that shown in FIG. 10. The diaphragm 35 deformed to the state shown in FIG. 10 is separated from the connection metal 34 and battery cell current is cut-off. The deformed diaphragm 35 in the state shown in FIG. 10 is maintained in this state, which is the current cut-off state or the OFF state, and is not restored to the ON state. Consequently, if battery cell internal pressure exceeds the set pressure, the current interrupt device 30 cuts-off current and thereafter is maintained in the current cut-off state.

Figure 11:
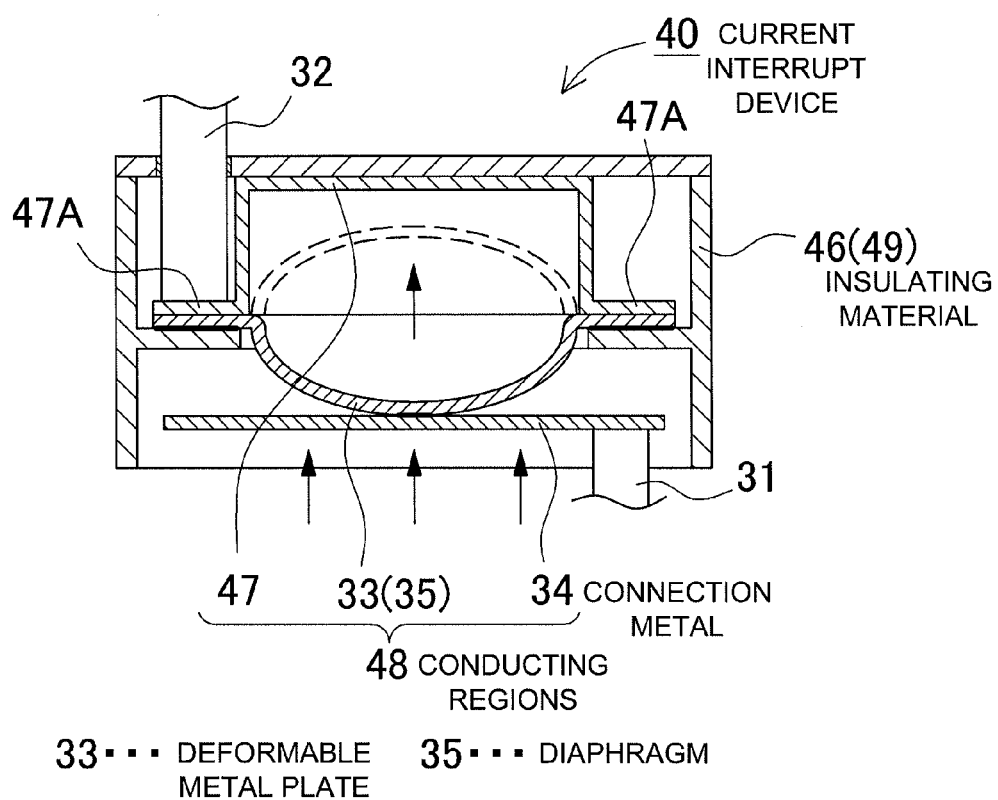
FIG. 11 is an abbreviated cross-sectional view showing another example of a current interrupt device.

As shown in FIG. 11, the current interrupt device 40 includes a diaphragm 35, which is a deformable metal plate 33. The plate 33 can be attached in an air-tight fashion to a cover plate 47 to seal-off the upper surface of the diaphragm 35. In a current interrupt device 40 of this configuration, the cover plate 47 and diaphragm 35 are formed in a disk shape by welding them together at their peripheries or by crimping their peripheries together in an air-tight fashion. The cover plate 47 is provided with a step flange 47A around its periphery that protrudes towards the diaphragm 35, and the periphery of the diaphragm 35 is attached to this step flange 47A. The projecting peak region of the diaphragm 35 is connected to the connection metal 34 by welding. When internal battery cell pressure is lower than the set pressure, the current interrupt device 40 has its diaphragm 35 connected to the connection metal 34 and is in the ON state. Specifically, the ON state allows battery current to flow. When the pressure of the internal battery cell 1 rises abnormally and exceeds the set pressure, the diaphragm 35 deforms to the position shown by the broken lines of FIG. 11 and separates from the connection metal 34 to cut-off current. In this state, the diaphragm 35 is maintained in the upward curved configuration. As shown in FIG. 11, for a current interrupt device 40 with one surface of diaphragm 35 sealed-off in an air-tight fashion by a cover plate 47, it is unnecessary for the inner case 46 to seal-off the upper surface of the diaphragm 35 in an air-tight fashion and the structure of the inner case 46 can be simplified.

The current interrupt device 30, 40 is connected between an electrode terminal 32 that is mounted on the sealing plate 22 and the electrode unit 10 housed inside the case 20. Therefore, if the current interrupt device 30, 40 or the electrode unit 10 moves inside the case 20 due to a condition such as vibration, excessive force can be applied to the connection region of the deformable metal plate diaphragm 35 to the connection metal 34 with the detrimental result that the connection region weld can separate.

Figure 6:
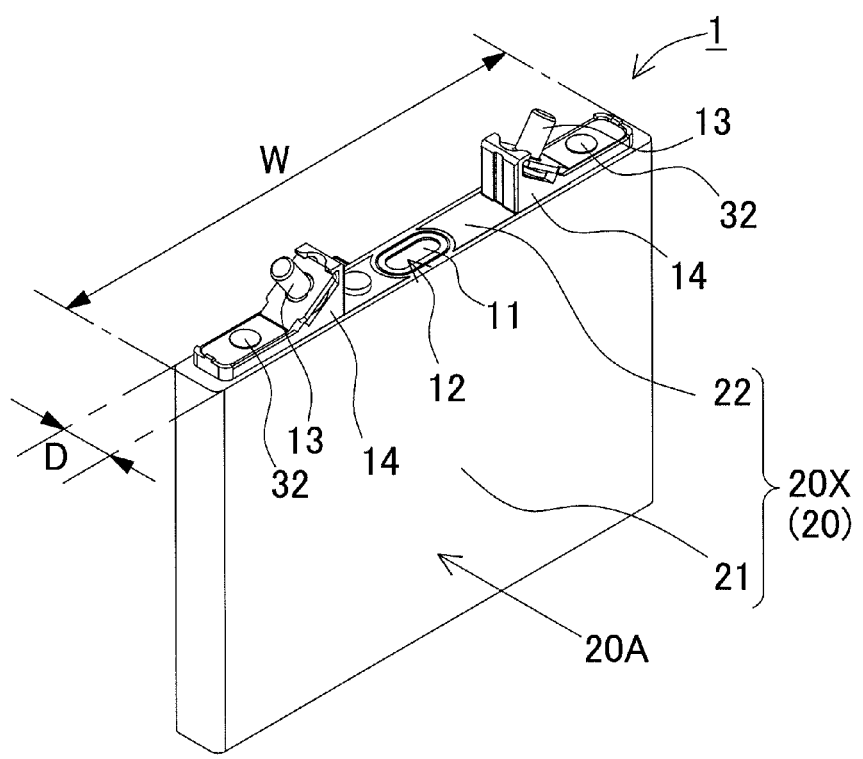
FIG. 6 is a perspective view of a battery cell.

As shown in FIGS. 6 and 8, to prevent this detrimental effect, a battery cell 1 has a rectangular outline with a pair of opposing planar surfaces 20A, and the electrode unit 10 and current interrupt device 30 are contained between the pair of opposing planar surfaces 20A to form a rectangular battery cell 1. In addition, a plurality of these battery cells 1 is stacked with opposing planar surfaces 20A opposite each other to form a battery block 2, and the battery block 2 is held with pressure applied by the endplates 5 at both ends of the battery block 2. For a battery cell 1 retained in this manner, opposing planar surfaces 20A are pressed towards each other and the electrode unit 10 and current interrupt device 30 contained inside are held in a stationary manner that does not vibrate.

A battery cell case 20 is made from metal or is molded from hard plastic. A metal case 20 is made from aluminum, aluminum alloy, iron, steel, or other iron alloy. A metal case 20 is made by pressing deformable metal plate in the shape of a cylinder with a closed bottom to form an external case 21, and by closing off the open region of this external case 21 in an air-tight fashion with a sealing plate 22. The sealing plate 22 is attached to the external case 21 by a method such as laser welding. The external case 21 is formed in a rectangular cylindrical shape with rectangular opposing planar surfaces 20A on both sides, or it is formed in a cylindrical shape with opposing planar surfaces on both sides connected by U-shaped rounded surfaces. Positive and negative electrode terminals 32 are mounted to pass through the metal sealing plate 22 in a manner that is insulating and air-tight.

By reducing battery cell case 20 thickness (D) to width (W) ratio (D)/(W), the internally housed electrode unit 10 and current interrupt device 20 can be compressed by opposing planar surfaces 20A on both sides and held in a manner that is more difficult to move. Consequently, the case thickness (D) to width (W) ratio (D)/(W) is made, for example, less than or equal to 1/2, preferably less than or equal to 1/3, and more preferably less than or equal to 1/4. However, if the thickness (D) to width (W) ratio (D)/(W) is made too small, the case 20 will be too thin and battery capacity efficiency will drop off. Therefore, thickness (D) to width (W) ratio (D)/(W) is made, for example, greater than or equal to 1/50, preferably greater than or equal to 1/40, and more preferably greater than or equal to 1/30.

As shown in FIGS. 7-11, a metal case 20X is provided with insulating material 39, 49 between the inside surfaces of the case and the conducting regions 38, 48 of the current interrupt device 30, 40 to establish a structure that avoids contact of the metal case 20X with the conducting regions 38, 48 of the current interrupt device 30, 40. In the battery cell 1, the current interrupt device 30, 40 is contained in an insulating plastic inner case 36, 46, and the inner case 36, 46 serves as insulating material 39, 49 to insulate the conducting regions 38, 48 of the current interrupt device 30, 40 from the metal case 20X. Further, insulating material 29 is provided between inside surfaces of the metal case 20X and conducting regions of the electrode unit 10 to establish a configuration that avoids contact between electrode plates 10A, which are the conducting regions of the electrode unit 10, and the metal case 20X. Insulating material of the electrode unit 10 can be insulating separators 10C that are stacked with the electrode unit 10, an insulating layer 28 laminated on inside surfaces of the case 20, or a coating on the inside of the case 20 to form an insulating layer 28.

As shown in FIG. 8, the electrode unit 10 is made by rolling positive and negative electrode plates 10A with separators 10 sandwiched in between into a spiral-shape and pressing that spiral roll from both sides to make it flat. This electrode unit 10 has a spiral structure with planar sections 10X on both sides connected by U-shaped rounded sections 10Y. This electrode unit 10 is inserted into the case 20 with the planar sections 10X parallel to the opposing planar surfaces 20A of the case 20. When this electrode unit 10 is held in the case 20, it is pressed upon by the opposing planar surfaces 20A of the case 20 with force that tends to restore it to its original flat spiral-shape. Accordingly, the planar sections 10X of this electrode unit 10 can be pressed with a restoring force by the inside surfaces of the opposing planar surfaces 20A of the case 20. As a result, the electrode unit 10 can be retained in a more immovable fashion via a structure that holds the electrode unit 10 with pressure applied by the opposing planar surfaces 20A of the case 20. However, the power source apparatus of the present invention does not limit the battery cell electrode unit to a unit wound in a spiral-shape. This is because a plurality of positive and negative electrode plates and intervening separators can also be cut in the rectangular-shape of the battery cell opposing planar surfaces, stacked, and held in the case. This type of electrode unit is retained in the case with electrode plates parallel to the opposing planar surfaces of the case.

The electrode unit 10 has electrode tabs 31 connected to positive and negative electrode plates 10A. The electrode tabs 31 are connected to the positive and negative electrode terminals 32. The battery cell 1 of FIG. 7 has one electrode tab 31 connected to the current interrupt device 30, and that electrode tab 31 is connected to the electrode terminal 32 through the current interrupt device 30. Further, as shown in FIG. 6, the positive and negative electrode terminals 32 are connected to positive and negative output terminals 32 on the upper surface of the sealing plate 22. The sealing plate 22 has positive and negative output terminals 13 attached at both ends of its upper surface via insulating material 14. Consequently, positive and negative output terminals 13 are connected to the internally contained positive and negative electrode plates 10A, respectively.

Further, the sealing plate 22 that closes-off the open end of the external case 21 is provided with an opening 12 for a safety valve 11. The safety valve 11 opens to prevent damage to the case 20 if internal pressure becomes greater than a set value. The set pressure for opening safety valve 11 is made greater than the set pressure for activating current interrupt device 30 to cut-off current. Specifically, when the internal pressure of battery cell 1 rises and exceeds the set pressure for current cut-off, the deformable metal plate 33 of the current interrupt device 30 is deformed by the internal pressure and separates from the connection metal 34 to cut-off current. In this state, battery cell current is cut-off to assure safety. If internal pressure rises further with the current interrupt device 30 in the current cut-off state and becomes greater than the set pressure for opening safety valve 11, the safety valve will open. In the battery cells 1, the opening 12 of safety valve 11 is provided in the sealing plate 22. This external case 21 can discharge gas from the opening 12 of an open safety valve 11. This is because gas accumulates inside the case 20. A safety valve opening can also be established on a bottom or side surface of the external case. However, when this type of safety valve opens, electrolyte solution is discharged. If electrolyte solution, which is a conducting liquid, is discharged, it can short circuit material that it contacts. A battery cell 1 with the safety valve 11 established in the sealing plate 22 of the case 20 can reduce internal pressure by discharging gas from an open safety valve 11. Consequently, when the safety valve 11 opens, electrolyte solution discharge is restrained and detrimental effects due to the release of electrolyte solution are minimized.

The power source apparatus of FIG. 1 is provided with gas exhaust ducts 18 on top of the car power source apparatus to exhaust gas discharged from the safety valves 11 to the outside. Openings in the bottom of a gas exhaust duct 18 connect to safety valve openings 12 to exhaust gas discharged from the safety valves 11 to the outside. In this structure, gas discharged from a battery cell 1 with an open safety valve 11 can be quickly exhausted to the outside.

A plurality of battery cells 1 are stacked with opposing planar surfaces 20A opposite each other to form a battery block 2. Adjacent output terminals 13 of the stacked battery cells 1 are connected via connecting hardware (not illustrated) to connect the battery cells 1 in series. In addition, a wire-lead (not illustrated) is connected to the output terminals 13 of each battery cell 1. These wire-leads are connected to a circuit board (not illustrated) that implements a protection circuit that detects battery cell voltage. Although not illustrated, the circuit board is disposed on top of the car power source apparatus in FIGS. 1 and 2.

Spacers 15 are sandwiched between battery cells 1. The spacers 15 insulate the external cases 21 of adjacent battery cells 1, and establish cooling gaps 16 between battery cells 1 to cool the battery cells 1. Consequently, the spacers 15 are formed from insulating material such as plastic. The spacers 15 are provided with grooves 15A on both surfaces to establish cooling gaps 16 between adjacent battery cells 1. The spacers 15 are provided with grooves 15A that extend in the horizontal direction, namely the grooves 15A extend in a direction that joins both side-walls of the battery cells 1. Air flows in the horizontal direction through the cooling gaps 16 established by spacers 15 to cool the battery cells 1.

Battery cells 1 are stacked via the spacers 15 and retained in fixed positions via fastening components 3. The fastening components 3 are a pair of endplates 4 disposed at both ends of the stacked battery cells 1, and connecting components 5 with end regions connected to the endplates 4 to retain the stacked battery cells 1 in a compressed state. The battery block 2 is held with the endplates 4 disposed at both ends joined by the connecting components 5 to retain the stacked battery cells 1 with pressure applied in a direction perpendicular to the opposing planar surfaces 20A.

Figure 3:
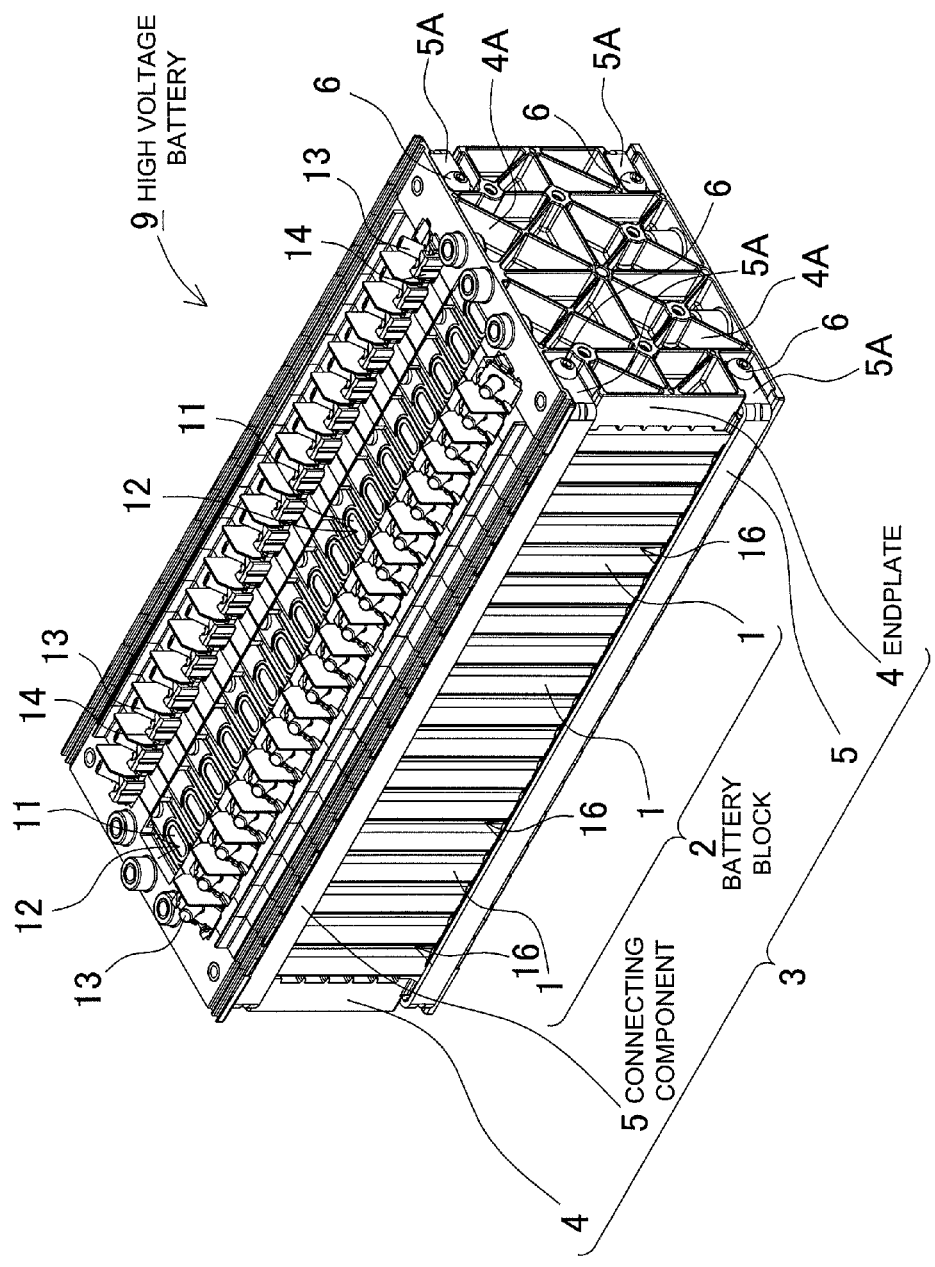
FIG. 3 is a perspective view of a high voltage battery shown in FIG. 2.
Figure 4:
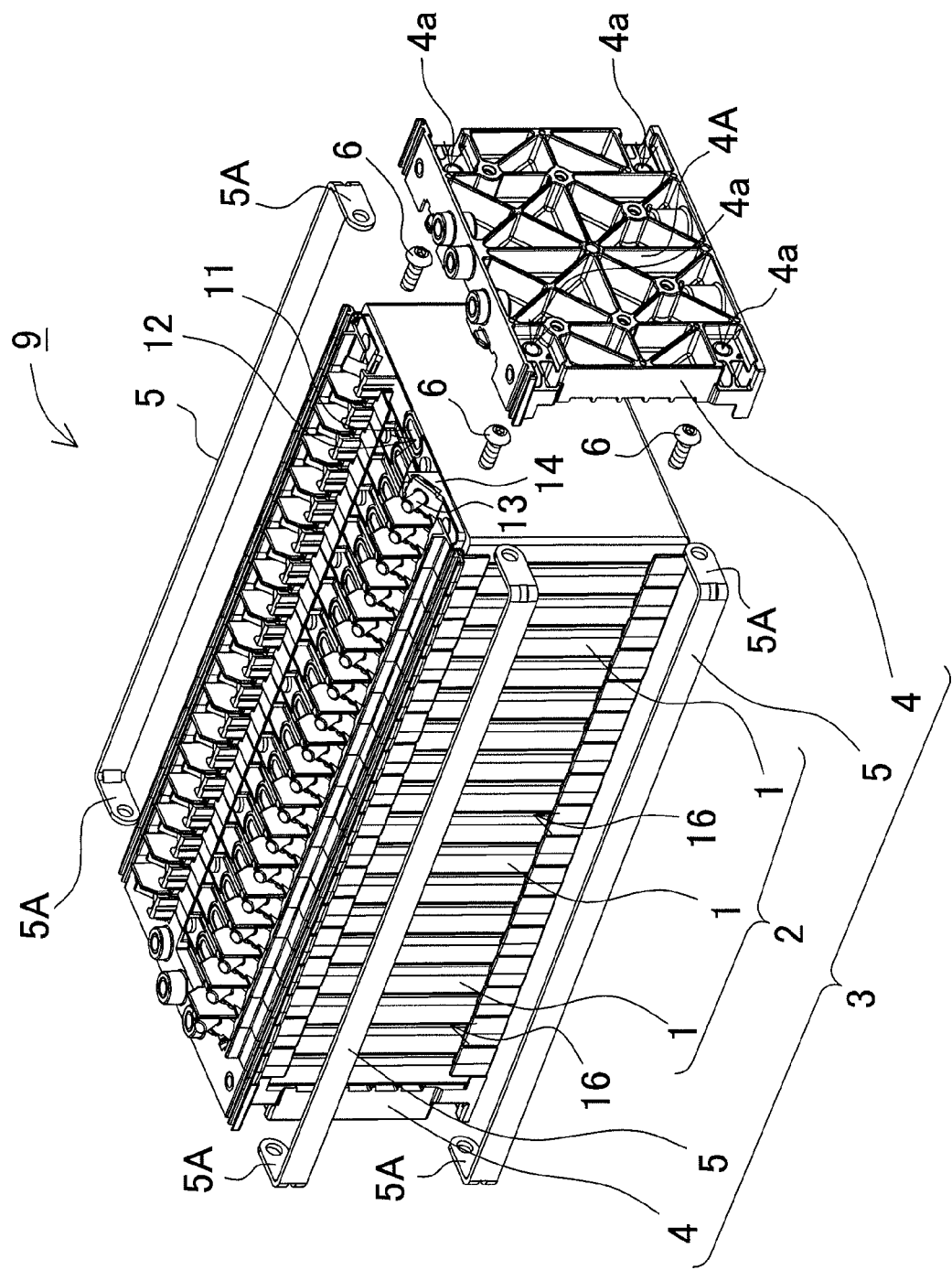
FIG. 4 is an exploded perspective view of the high voltage battery shown in FIG. 3.

The endplates 4 are made of aluminum or an alloy of aluminum, or they are molded from hard plastic. The endplates 4 of FIGS. 3 and 4 are provided with reinforcing ribs 4A extending vertically and horizontally on the outside surface and formed in single-piece construction with the endplates 4. The bending strength of these endplates 4 is strengthened by the reinforcing ribs 4A. Endplates 4 with exceptional bending strength can effectively prevent expansion at the center regions of rectangular batteries. This is because battery cell center region expansion will not occur as long as the endplates 4 connected by connecting components 5 do not distort. To sandwich the rectangular batteries over a wide area, endplates 4 are made with external shapes that are the same rectangular shape as the rectangular battery cells 1. The rectangular endplates 4 are made the same size as the rectangular batteries or very slightly larger than the rectangular batteries. Further, the endplates 4 are provided with grooves in the sides opposite battery cells 1 for cooling air flow, and these grooves establish cooling gaps 16 between the endplates 4 and the rectangular batteries. However, surfaces of the endplates opposite the battery cells can also be flat planar surfaces and those planar surfaces can be put in contact with the surfaces of rectangular batteries or spacers. Plastic endplates 4 can be stacked directly on rectangular batteries, while metal endplates are stacked on rectangular batteries via stacking material.

The ends of the connecting components 5 are connected to the endplates 4. The ends of the connecting components 5 are connected to the endplates 4 by set screws 6, or the end regions are folded inward to connect to the endplates, or nuts are threaded on at the ends of the connecting components, or the ends of the connecting components are connected to the endplates by snapping or crimping into latches. An endplate 4 that connects with connecting components 5 via set screws 6 is provided with screw-holes 4a to accept the set screws 6. The screw-holes 4a are provided in the outer surface of an endplate 4, and set screws 6 passing through bent regions 5A of the connecting components 5 are screwed into those screw-holes 4a to connect the connecting components 5.

The high voltage battery 9 of FIGS. 3 and 4 has first connecting components 5 disposed along the upper ends of the battery cells 1, which are rectangular batteries, and second connecting components 5 disposed along the lower ends of the rectangular batteries connected to the endplates 4. In this high voltage battery 9, screw-holes 4a are established in the upper and lower ends on both sides of the outer surfaces of the endplates 4. This high voltage battery 9 holds the upper and lower parts of the rectangular battery cells 1 with connecting components 5. For connection of the ends of the connecting components 5 to the endplates 5 via set screws 6, screw-holes 4 are provided at locations where the ends of the connecting components 5 attach to the endplates 4.

The connecting components 5 are fabricated from sheet metal formed with a prescribed thickness and prescribed width. The ends of the connecting components 5 connect to endplates 4 to join the pair of endplates 4 and hold battery cells 1 in a compressed state between the endplates 4. Connecting components 5 attach with prescribed dimensions to the pair of endplates 4 to retain battery cells 1 stacked between the endplates 4 in a prescribed state of compression. If the connecting components 5 stretch with battery cell expansion pressure, battery cell expansion cannot be prevented. Therefore, connecting components 5 are made from sheet metal strong enough to avoid stretching with battery cell expansion pressure, and are formed with a width and thickness for sufficient strength from stainless steel such as SUS304, steel, or other sheet metal. Further, connecting components can also be formed with side-walls in the shape of channels or rails. Since connecting components with this shape can improve bending strength, they have the characteristic that stacked rectangular batteries can be robustly retained in a prescribed state of compression while reducing the connecting component width.

A connecting component 5 is provided with bent regions 5A at its ends, and these bent regions 5A are connected to the endplates 4. Set screw through-holes are established in the bent regions 5A, and the connecting components 5 are attached to the endplates 4 via set screws 6 inserted through the through-holes.

Although not illustrated, a single long connecting component can be bent at its mid-region to connect the bent region around the outer surface of one endplate and connect both ends to the other endplate. This type of connecting component can be sturdily connected to one endplate at its bent mid-region that loops around that endplate. Further, the connecting component can also be attached to that endplate in single-piece construction. This type of connecting component can be attached to one endplate with maximum robustness.

Figure 5:
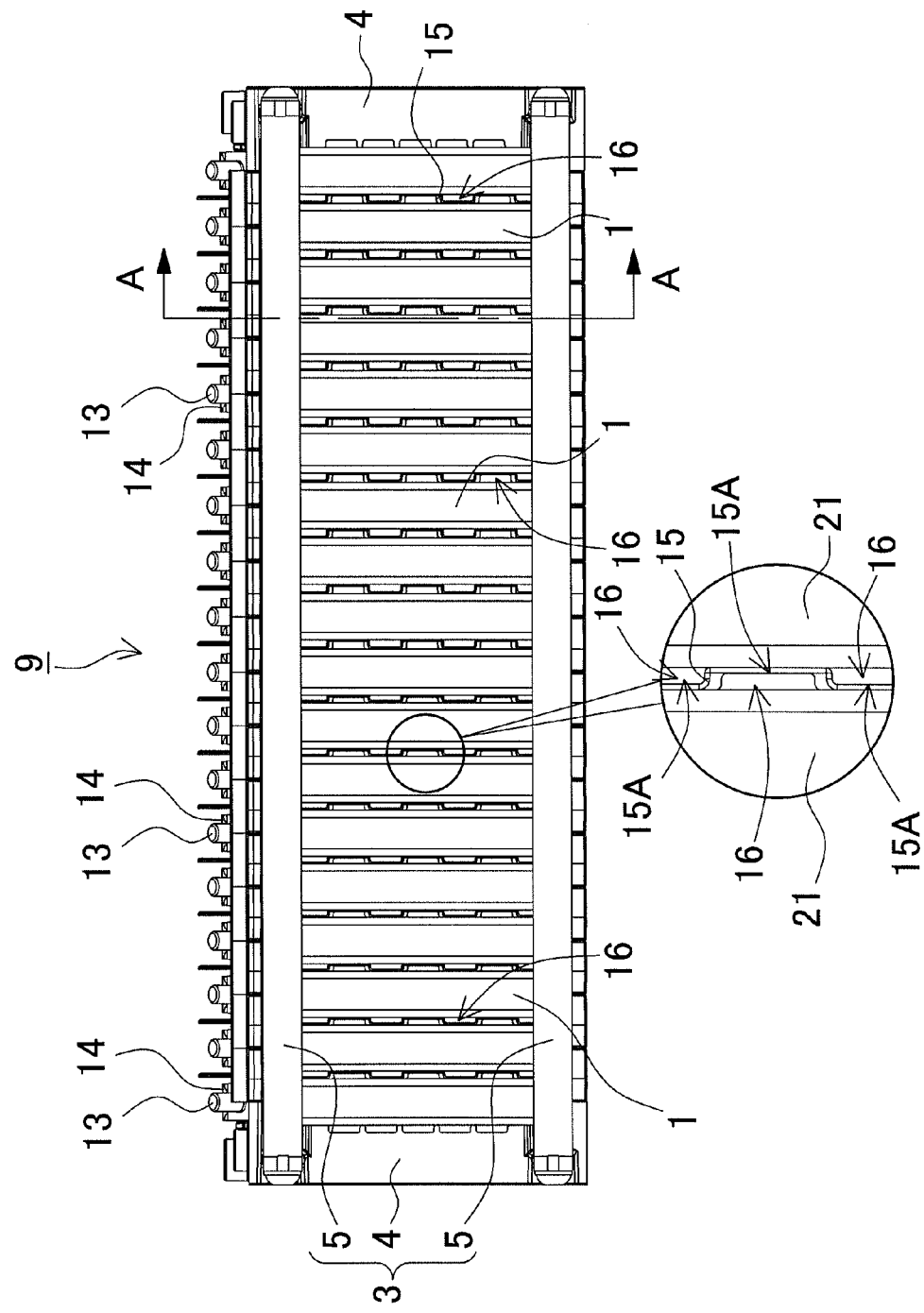
FIG. 5 is a side view of the high voltage battery shown in FIG. 3.

The car power source apparatus described above is assembled by the following process. The high voltage battery 9 of FIGS. 3-5 is assembled in the following manner.

Battery Block Compression Process

Spacers 15 are disposed between the battery cells 1, which are rectangular batteries. The spacers 15 and battery cells 1 are stacked to form a battery block 2, and endplates 4 are disposed at both ends of the battery block 2. In this configuration, both endplates 4 are pressed and held in a holder tool. The unit is compressed until a prescribed dimension is established between the endplates 4, and this configuration is maintained.

Connecting Component Attachment Process

The battery block 2 is retained in the compressed state and both ends of the connecting components 5 are attached to the endplates 4. The connecting components 5 have bent regions 5A with through-holes provided at both ends. These connecting components 5 are attached to the endplates 4 by screwing set screws 6 inserted through the through-holes in the bent regions 5A into screw-holes 4a in the endplates 4.

Holder Tool Removal Process

After all the connecting components 5 have been attached to the endplates 4, the holder tool is removed. By the assembly process described above, stacked battery cells 1, which are rectangular batteries, are maintained in a compressed state between a pair of endplates 4. Consequently, even if battery cells 1 have a tendency to expand due to a condition such as over-charging, the distance between endplates 4 does not change, and battery cell expansion is prevented by the endplates 4. In this high voltage battery 9, since both ends of the connecting components 5 are attached to the endplates 4 by set screws 6, connecting components 5 are robustly connected to the endplates 4, and prescribed dimensions are maintained between endplates 4 via the connecting components 5. Furthermore, in this state, battery cell electrode units 10 and current interrupt devices 30 are retained with pressure applied by opposing planar surfaces 20A of the cases 20. Therefore, there is no movement of the electrode units 10 or the current interrupt devices 30 due to vibration, and relative motion between an electrode unit 10 and current interrupt device 30 to separate the connection region and cut-off current is prevented.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2008-335518 filed in Japan on Dec. 27, 2008, the content of which is incorporated herein by reference.

What is claimed is:

1. A car power source apparatus comprising:
a battery block including a plurality of battery cells connected in series or in parallel;
a pair of endplates disposed at the ends of the battery block; and
connecting components connected to the pair of endplates, wherein each of the battery cells comprises:
a case including an external case formed in a rectangular outline with a pair of opposing planar surfaces and a sealing plate attached to the opposing planar surfaces;
an electrode terminal mounted on the sealing plate;
an electrode unit housed in the case; and
a current interrupt device housed in the case, the current interrupt device being configured to be electrically connected between the electrode terminal and the electrode unit,
wherein the current interrupt device comprises a deformable member that is deformable to disconnect an electrical connection between the electrode terminal and the electrode unit when internal pressure of the battery cell exceeds a set pressure,
wherein the plurality of battery cells is held in a stacked configuration with the opposing planar surfaces opposing each other to form the battery block, the plurality of battery cells being held in the stacked configuration with pressure in a direction perpendicular to the opposing planar surfaces by the pair of endplates via the connecting components,
wherein the electrode unit is disposed between the opposing planar surfaces of the external case so that the electrode unit is pressed with a restoring force by inside surfaces of the opposing planar surfaces so as to prevent vibration, and
wherein the current interrupt device is secured to both the electrode unit and the electrode terminal mounted on the sealing plate.

2. The car power source apparatus as cited in claim 1, wherein the case is a metal case, and insulating material is provided between the inside surfaces of the case and conducting regions of the current interrupt device.

3. The car power source apparatus as cited in claim 1, further comprising an insulating material located on at least a part of the inside surfaces of the opposing planar surfaces of the external case,
wherein the external case is formed of metal, and the insulating material is interposed between the electrode unit and the inside surfaces of the opposing planar surfaces of the external case to establish non-electrical contact therebetween.

4. The car power source apparatus as cited in claim 1, wherein the electrode unit has positive and negative electrode plates and intervening separators stacked and wound in a spiral-shape with planar sections and U-shaped rounded sections, and the electrode unit is disposed in the case with the planar sections parallel to the opposing planar surfaces of the external case.

5. The car power source apparatus as cited in claim 1, wherein each of the battery cells is provided with a safety valve that opens when internal pressure of the battery cell becomes greater than a set pressure, and the set pressure for safety valve opening is set greater than the pressure for current cut-off by the current interrupt device.

6. The car power source apparatus as cited in claim 1, wherein connecting components include a first connecting component disposed along upper ends of the battery cells and a second connecting component disposed along lower ends of the battery cells.

* * * * *